US012614383B2

(12) United States Patent
Yoshikawa

(10) Patent No.: US 12,614,383 B2
(45) Date of Patent: Apr. 28, 2026

(54) LEARNING APPARATUS AND LEARNING METHOD

(71) Applicant: CANON KABUSHIKI KAISHA, Tokyo (JP)

(72) Inventor: Hiroshi Yoshikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 343 days.

(21) Appl. No.: 18/399,819

(22) Filed: Dec. 29, 2023

(65) Prior Publication Data

US 2024/0233357 A1    Jul. 11, 2024

(30) Foreign Application Priority Data

Jan. 10, 2023    (JP) ................................. 2023-001912

(51) Int. Cl.
G06V 10/82        (2022.01)
G06V 10/776        (2022.01)
(52) U.S. Cl.
CPC ............ G06V 10/82 (2022.01); G06V 10/776 (2022.01)
(58) Field of Classification Search
None
See application file for complete search history.

(56) References Cited

U.S. PATENT DOCUMENTS 11,481,627 B2 * 10/2022 Qiu ...................... G06N 3/0464
2020/0364570 A1 * 11/2020 Kitamura ............ G06F 18/2431
2021/0133555 A1 * 5/2021 Qiu ...................... G06N 3/0464
2023/0196722 A1   6/2023 Yoshikawa
2023/0334843 A1 * 10/2023 Fujita .................... G06V 10/82

OTHER PUBLICATIONS

Krizhevsky, A. et al., "ImageNet Classification with Deep Convolutional Neural Networks" NIPS (2012) pp. 1-9.
Caruana, R., "Multitask Learning" Machines Learning (Jul. 1997) pp. 41-75, vol. 28.

* cited by examiner

*Primary Examiner* — Dov Popovici
(74) *Attorney, Agent, or Firm* — Carter, DeLuca & Farrell LLP

(57)        ABSTRACT

A learning apparatus performs a first assignment in which M tasks that are different from each other are assigned to N neural networks (where N<M) and perform learning processing that is related to the M tasks in parallel; and determines, based on learning results of the respective M tasks, whether to assign, in subsequent learning processing, the respective M tasks to the same neural networks as in the first assignment or to neural networks different from those of the first assignment.

13 Claims, 12 Drawing Sheets

F I G. 1
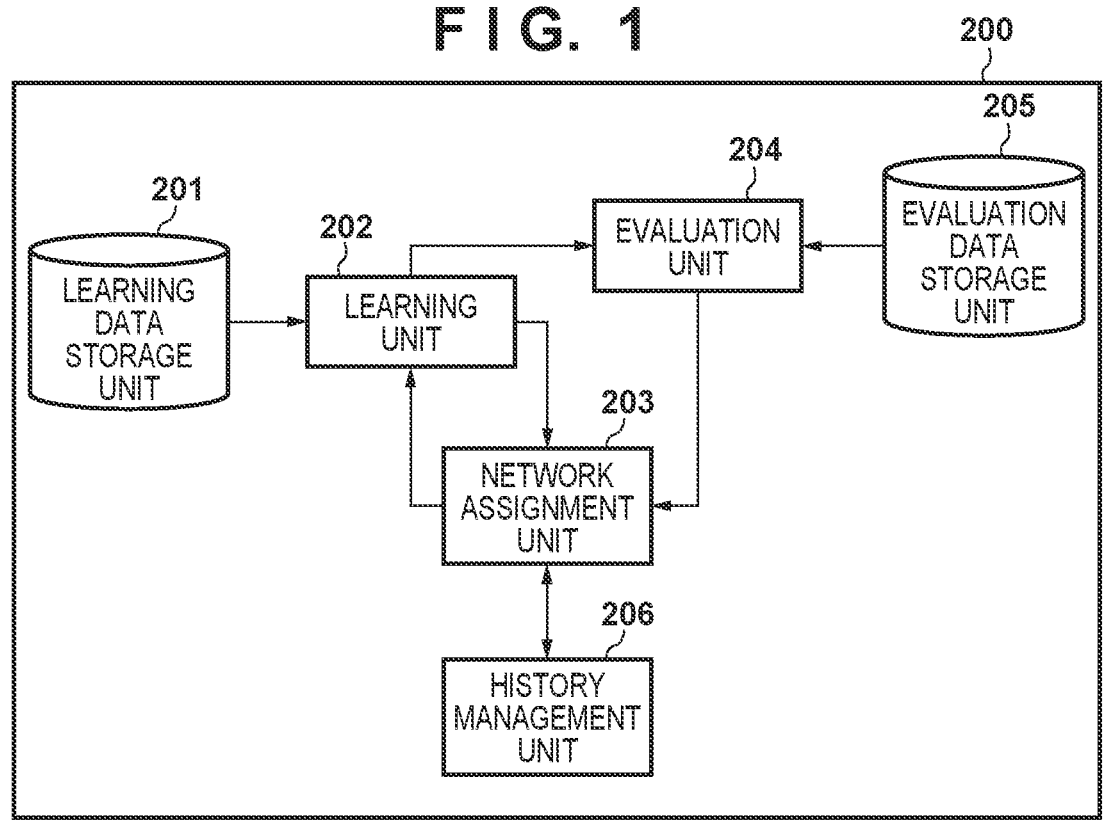

F I G. 3A
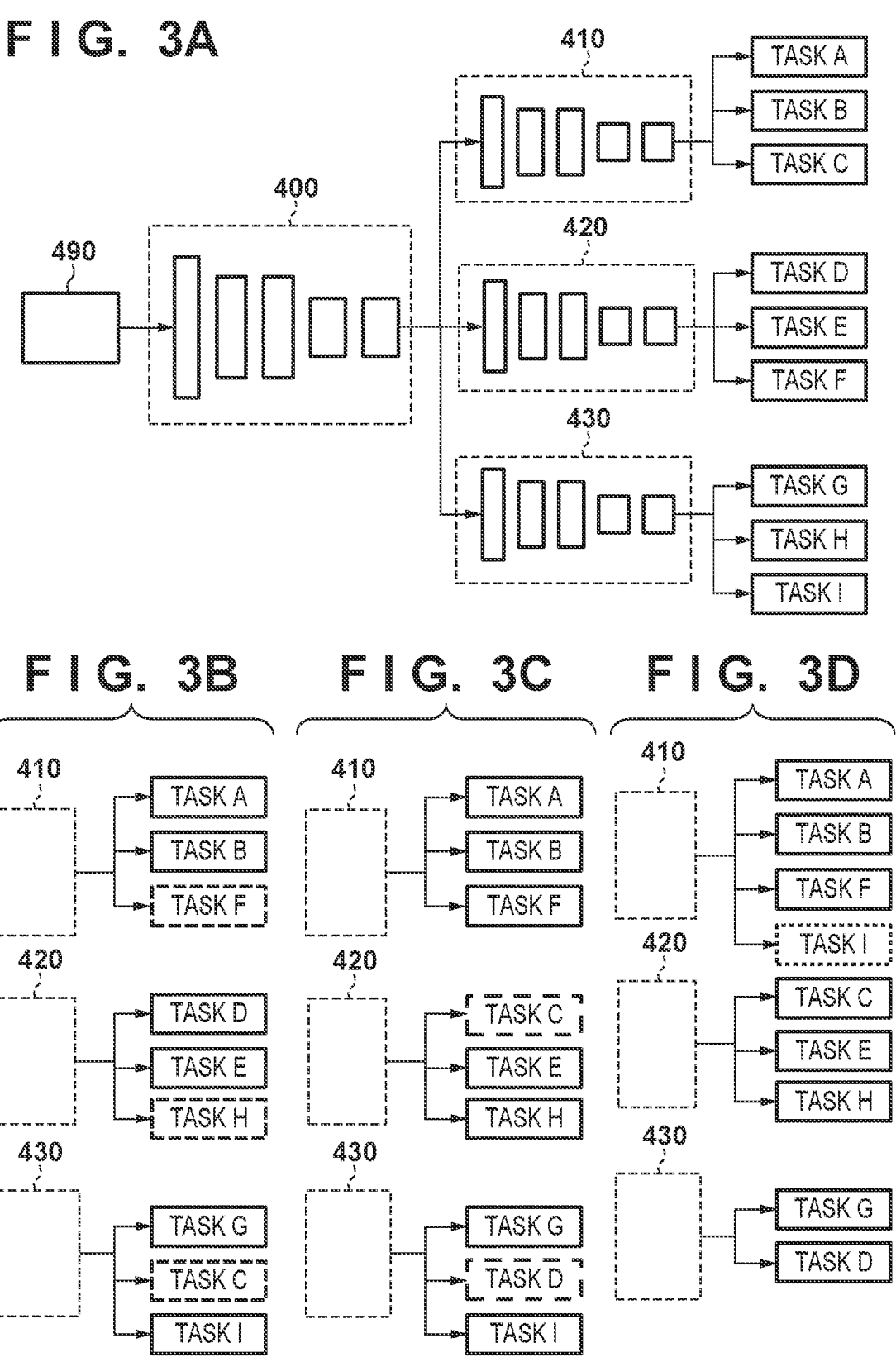

F I G. 4A

| | INITIAL STATE | FIRST UPDATE | SECOND UPDATE | THIRD UPDATE |
|---|---|---|---|---|
| SUBSEQUENT STAGE SHARED LAYER NETWORK 410 | A, B, C | A, B, F | A, B, F (NO UPDATE) | A, B, F, I |
| SUBSEQUENT STAGE SHARED LAYER NETWORK 420 | D, E, F | D, E, H | E, H, C | E, H, C (NO UPDATE) |
| SUBSEQUENT STAGE SHARED LAYER NETWORK 430 | G, H, I | G, I, C | G, I, D | G, D |

F I G. 4B

| | TASK A | TASK B | TASK C | TASK D | TASK E | TASK F | TASK G | TASK H | TASK I |
|---|---|---|---|---|---|---|---|---|---|
| TASK A | | 1-410○ | 1-410× | | | 2-410○ | | | 4-410○ |
| TASK B | 1-410○ | | 1-410× | | | 2-410○ | | | 4-410○ |
| TASK C | 1-410× | 1-410× | | | 3-420○ | | 2-430× | 3-420○ | 2-430× |
| TASK D | | | | | 1-420○ | 1-420× | 3-430○ | 2-420× | 3-430× |
| TASK E | | | 3-420○ | 1-420○ | | 1-420× | | 2-420○ | |
| TASK F | 2-410○ | 2-410○ | | 1-420× | 1-420× | | | | 4-410○ |
| TASK G | | | 2-430× | 3-430○ | | | | 1-430× | 4-430○ |
| TASK H | | | 3-420○ | 2-420× | 2-420○ | | 1-430× | | 1-430× |
| TASK I | 4-410○ | 4-410○ | 2-430× | 3-430× | | 4-410○ | 1-430○ | 1-430× | |

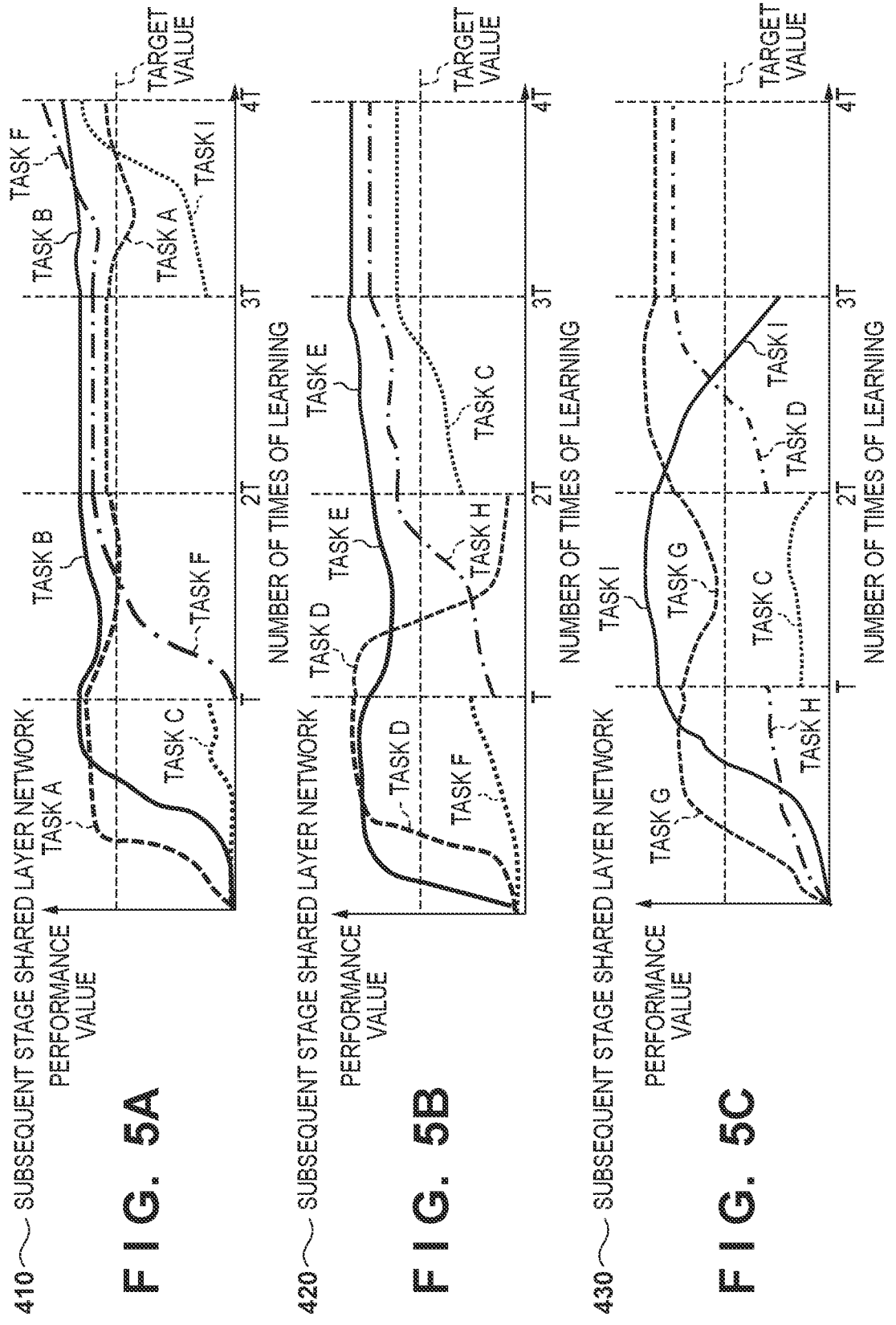
F I G. 5A
F I G. 5B
F I G. 5C

|  | TASK A | TASK B | TASK C |
|---|---|---|---|
| LEARNING RATE 0.5 | GOOD | GOOD | BAD |
| LEARNING RATE 1.0 | BAD | GOOD | BAD |
| LEARNING RATE 2.0 | GOOD | GOOD | GOOD |
| INTEGRATED DETERMINATION RESULT | GOOD | GOOD | BAD |

FIG. 9

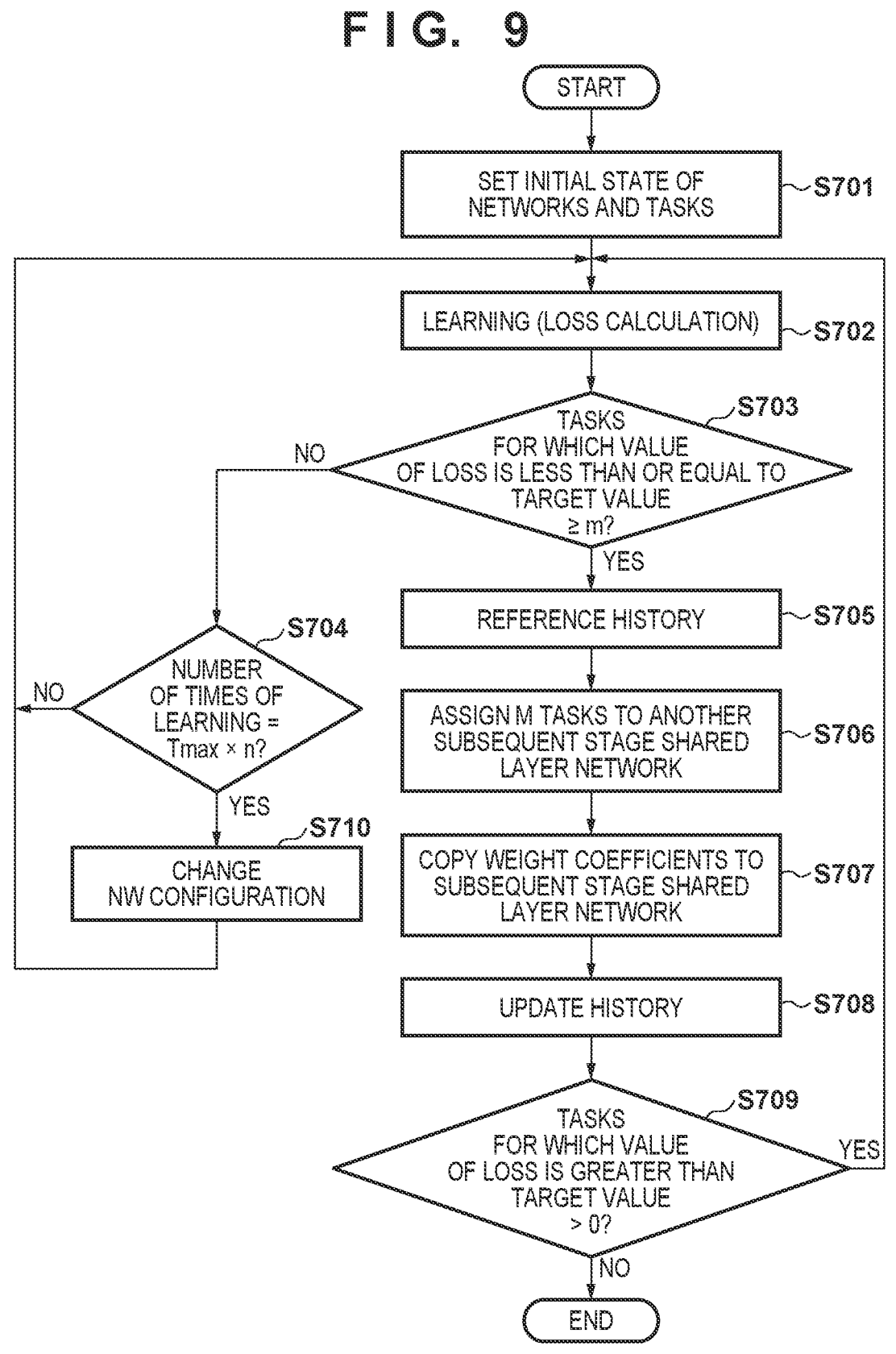

START

SET INITIAL STATE OF NETWORKS AND TASKS — S701

LEARNING (LOSS CALCULATION) — S702

S703
TASKS FOR WHICH VALUE OF LOSS IS LESS THAN OR EQUAL TO TARGET VALUE ≥ m?

NO

YES

S704
NUMBER OF TIMES OF LEARNING = Tmax × n?

NO

YES

REFERENCE HISTORY — S705

ASSIGN M TASKS TO ANOTHER SUBSEQUENT STAGE SHARED LAYER NETWORK — S706

COPY WEIGHT COEFFICIENTS TO SUBSEQUENT STAGE SHARED LAYER NETWORK — S707

CHANGE NW CONFIGURATION — S710

UPDATE HISTORY — S708

S709
TASKS FOR WHICH VALUE OF LOSS IS GREATER THAN TARGET VALUE > 0?

YES

NO

END

F I G. 11A

| | INITIAL STATE | FIRST UPDATE | SECOND UPDATE | THIRD UPDATE |
|---|---|---|---|---|
| SUBSEQUENT STAGE SHARED LAYER NETWORK 610 | | | A, G, I | A, G, I (NO UPDATE) |
| SUBSEQUENT STAGE SHARED LAYER NETWORK 620 | A, B, C, D, E, F, G, H, I | A, C, F, G, H, I | C, F, H | C, F, H (NW CONFIGURATION CHANGED) |
| SUBSEQUENT STAGE SHARED LAYER NETWORK 630 | | B, D, E | B, D, E (NO UPDATE) | B, D, E (NO UPDATE) |

F I G. 11B

| | TASK A | TASK B | TASK C | TASK D | TASK E | TASK F | TASK G | TASK H | TASK I |
|---|---|---|---|---|---|---|---|---|---|
| TASK A | | | | | | | 2-420 O | | 2-420 O |
| TASK B | | | | 1-420 O | 1-420 O | | | | |
| TASK C | | | | | | 3-420 X | | 3-420 X | |
| TASK D | | 1-420 O | | | 1-420 O | | | | |
| TASK E | | 1-420 O | | 1-420 O | | | | | |
| TASK F | | | 3-420 X | | | | | 3-420 X | |
| TASK G | 2-420 O | | | | | | | | 2-420 O |
| TASK H | | | 3-420 X | | | 3-420 X | | | |
| TASK I | 2-420 O | | | | | | 2-420 O | | |

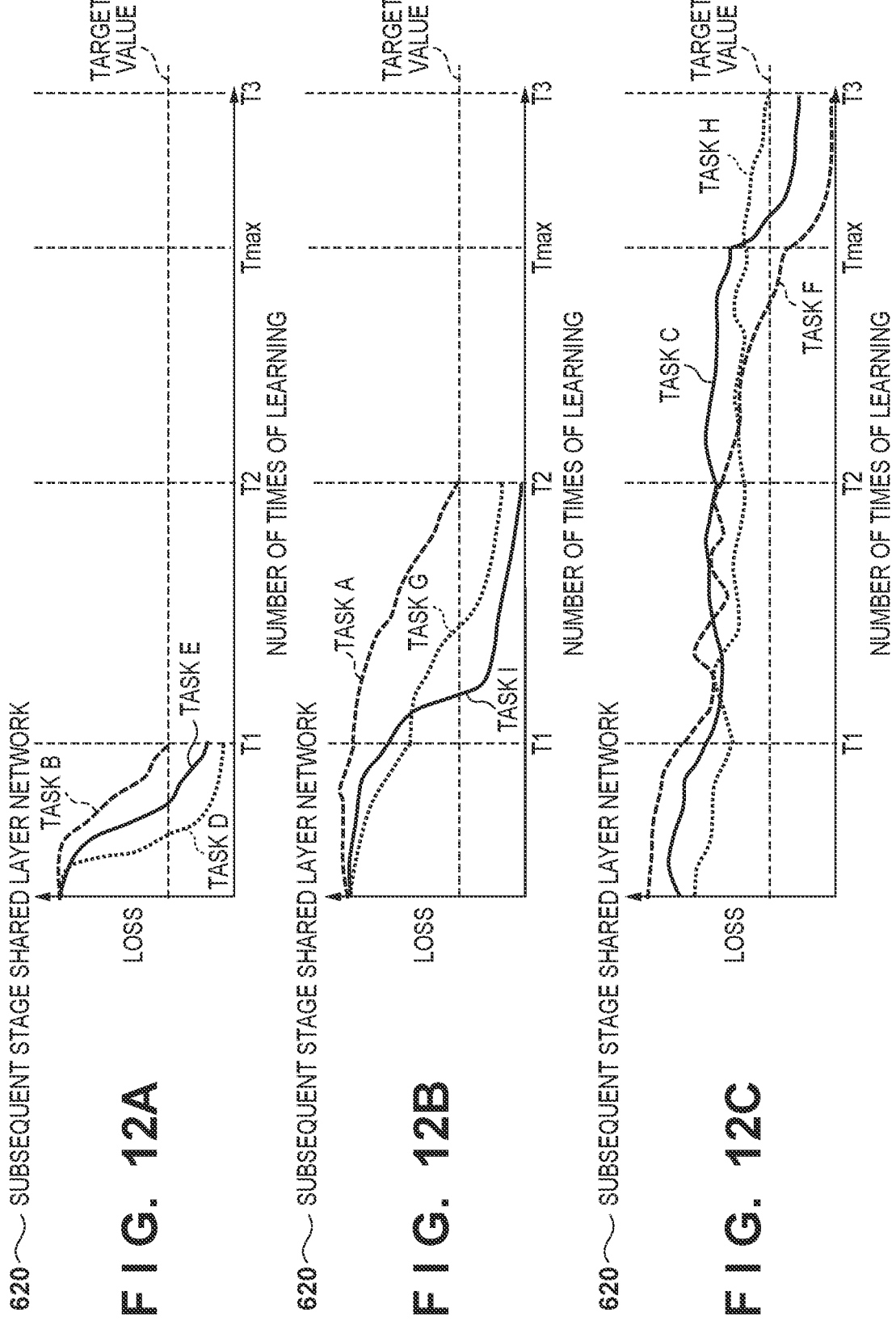

F I G. 13
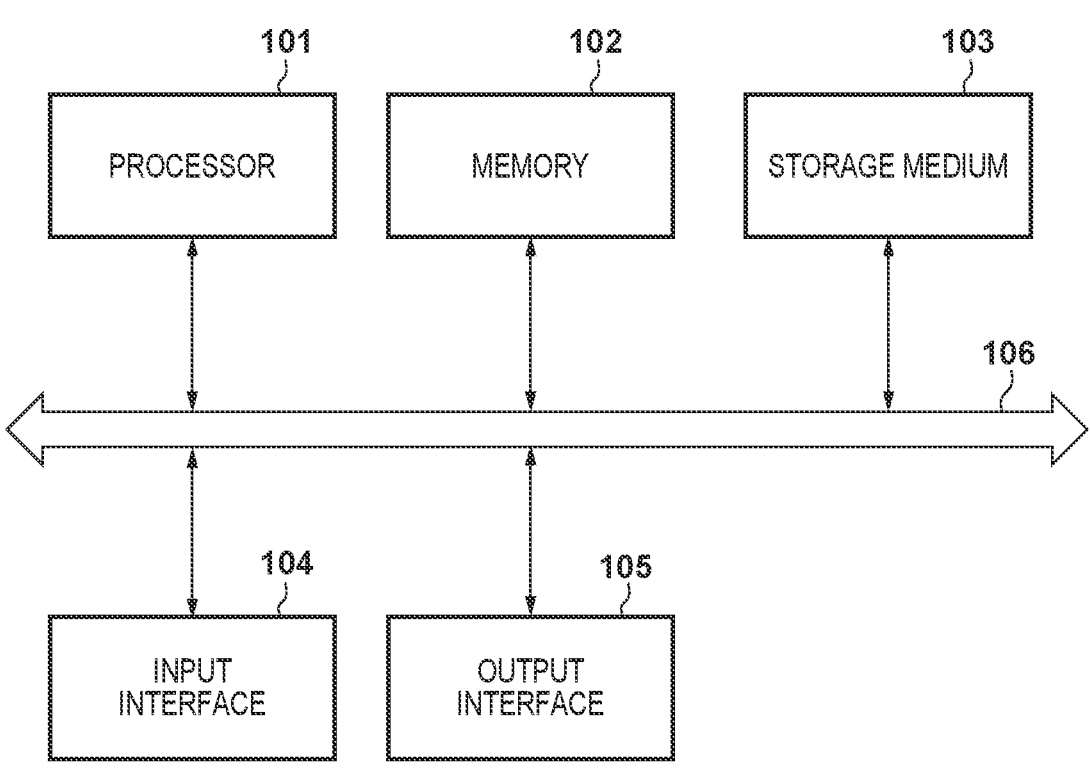

LEARNING APPARATUS AND LEARNING METHOD

BACKGROUND OF THE INVENTION

Field of the Invention

The present invention relates to learning of neural networks.

Description of the Related Art

There are techniques for learning contents of data such as images and sounds, and performing recognition. An objective of a recognition process is referred to as a "recognition task", and a mathematical model for learning and performing a recognition task is referred to as a "recognition model".

Recognition tasks include, for example, an object detection task for detecting a specific object (a face, a pupil, a head, an animal, a vehicle, or the like) from an image. There also is a region detection task for performing object detection on a pixel-by-pixel basis of an image called semantic region division. In addition, there are various recognition tasks such as an object category recognition task for determining a category (a human, an animal, a vehicle, or the like) of an object (subject) in an image, a tracking task for searching for and tracking a particular subject, and a scene type recognition task for determining a scene type (a city, a mountain area, a coastal area, or the like).

Neural networks (NNs) are known as a technology for learning and performing the above-described tasks. Deep (a large number of layers) multilayered neural networks are also referred to as deep neural networks (DNN). In particular, deep convolutional neural networks are referred to as DCNNs. DCNNs have attracted attention in recent years because of their higher performance (recognition accuracy and recognition performance).

In addition, there is a technique called multitask learning, in which a plurality of tasks are learned and performed by one recognition model. For example, Caruana, R., "Multitask learning, Machine learning", 28(1), 41-75, 1997 (Non-Patent Document 1) describes how to learn a plurality of tasks using a single DNN provided with a plurality of output units for a plurality of tasks. In Non-Patent Document 1, a portion of a DNN has shared layers that all tasks use, and the shared layers are learned using data of all of the tasks.

However, in a case where a plurality of tasks are assigned to one network, the performance of one task may decrease as the performance of another task increases, depending on the combination of tasks. In particular, in a case where the size of the network is small, such as a case where high-speed processing and low power consumption are required, there will likely be a trade-off relationship.

An inappropriate combination not only takes time to learn but may also prevent a desired target performance from being achieved.

SUMMARY OF THE INVENTION

According to one aspect of the present invention, a learning apparatus comprising one or more memories storing instructions and one or more processors that execute the instructions to: perform a first assignment in which M tasks that are different from each other are assigned to N neural networks (where N<M) and perform learning processing that is related to the M tasks in parallel; determine, based on learning results of the respective M tasks, whether to assign, in subsequent learning processing, the respective M tasks to the same neural networks as in the first assignment or to neural networks different from those of the first assignment.

The present invention provides a technique for determining appropriate task assignment for learning a plurality of tasks in parallel.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram illustrating a functional configuration of an information processing apparatus.

FIGS. 3A to 3D are diagrams illustrating configurations of NNs and task assignment.

FIGS. 4A and 4B are diagrams illustrating examples of history information.

FIGS. 5A to 5C are diagrams illustrating changes in performance values with respect to the number of times of learning.

FIG. 9 is a flowchart of learning processing (second embodiment).

FIGS. 11A and 11B are diagrams illustrating examples of history information (second embodiment).

FIGS. 12A to 12C are diagrams illustrating changes in loss with respect to the number of times of learning.

FIG. 13 is a block diagram illustrating a hardware configuration of the information processing apparatus.

DESCRIPTION OF THE EMBODIMENTS

Figure 2:
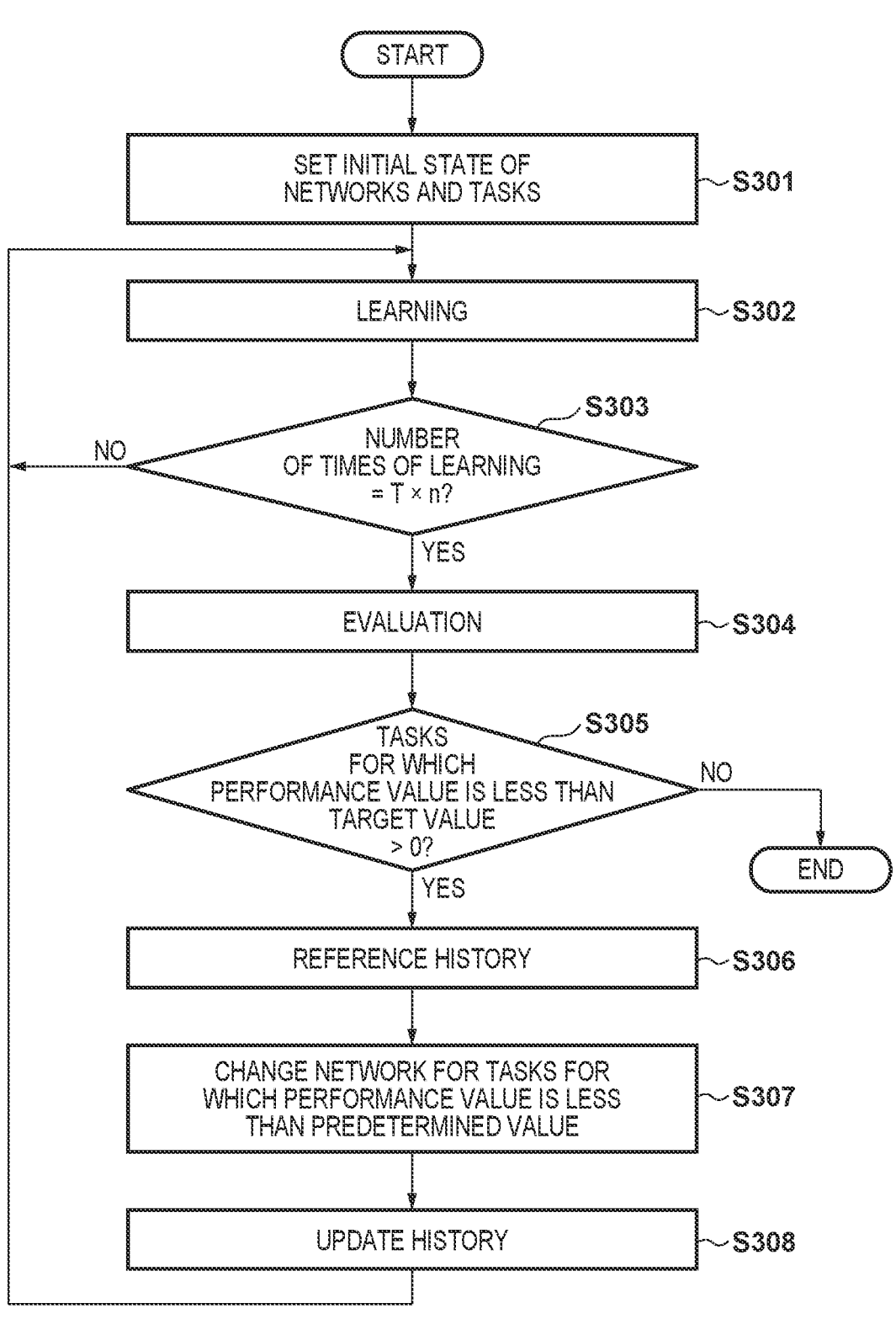
FIG. 2 is a flowchart of learning processing.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

As a first embodiment of a learning apparatus according to the present invention, an information processing apparatus that performs M types of tasks using N neural networks (NNs) will be described below as an example. In particular, in the following explanation, a case where N=3 and M=9 (FIGS. 3A to 3D) will be described.

<Apparatus Configuration>

FIG. 13 is a block diagram illustrating a hardware configuration of a computer for realizing the information processing apparatus. A processor 101 is, for example, a CPU and controls the operation of the entire computer. A memory 102 is, for example, a RAM and temporarily stores programs, data, and the like.

A computer-readable storage medium 103 may be, for example, a hard disk, a CD-ROM, or the like and stores programs, data, and the like for a long period. In the present embodiment, programs for realizing the functions of respective units stored in the storage medium 103 are read out to the memory 102. The functions of respective units are realized by the processor 101 operating in accordance with the programs in the memory 102.

An input interface 104 is an interface for obtaining information from external apparatuses. An output interface 105 is an interface for outputting information to external apparatuses. A bus 106 connects the aforementioned respective units and allows data to be exchanged.

FIG. 1 is a block diagram illustrating a functional configuration of an information processing apparatus 200. Here, it is assumed that each processing unit illustrated in FIG. 1 is realized by the computer illustrated in FIG. 13 executing a program. However, some or all of them may be realized by dedicated hardware.

The information processing apparatus 200 includes a learning data storage unit 201, a learning unit 202, a network assignment unit 203, an evaluation unit 204, an evaluation data storage unit 205, and a history management unit 206.

The learning data storage unit 201 stores learning data prepared in advance. The learning data includes learning images and teacher information. The learning unit 202 learns an NN using the learning images and the teacher information (ground truth information) stored in the learning data storage unit 201.

The network assignment unit 203 reassigns tasks that have been assigned to the NN based on the result of NN learning in the learning unit 202. In the present embodiment, a performance value calculated by the evaluation unit 204 using weight coefficients of the NN learned by the learning unit 202 and evaluation data is used as the learning result.

The evaluation unit 204 evaluates the performance of the NN using weight coefficients of the NN learned by the learning unit 202 and evaluation images and ground truth information stored in the evaluation data storage unit 205.

The evaluation data storage unit 205 stores evaluation data prepared in advance. Similarly to the learning data, the evaluation data includes evaluation images and ground truth information. The history management unit 206 manages N networks, the history of assignment of M tasks, and the results of learning in that assignment state, together.

<Operation of Apparatus>

FIG. 2 is a flowchart of learning processing to be performed by the information processing apparatus 200. Here, M types of tasks are performed using N NNs.

In step S301, the network assignment unit 203 sets an initial state of networks and tasks. In the present embodiment, the number of NNs N=3 and the number of tasks M=9, and the state in which three tasks are assigned to each NN is set as the initial state. What types of tasks are assigned to which network in the initial state may be randomly determined or may be determined by a user based on the categories of the tasks. In the present embodiment, three tasks are evenly assigned to three networks, but the processing may be started in a state in which they are unevenly assigned.

FIGS. 3A to 3D are diagrams illustrating configurations of NNs and task assignment. FIG. 3A is a diagram illustrating the configurations of NNs and the initial state of task assignment. An image 490 is an input for the NNs.

The NNs are configured by a preceding stage shared layer network 400 and subsequent stage shared layer networks 410, 420, and 430. The preceding stage shared layer network 400 is an NN to be a shared layer for all tasks. In addition, the subsequent stage shared layer networks 410, 420, and 430 are NNs to be shared layers only for the tasks assigned to the respective networks. However, as will be described later, the final layers of the subsequent stage shared layer networks 410, 420, and 430 are non-shared layers that hold different weight coefficients for each task.

As NNs, it is possible to use DCNNs or the like. Various types of configurations of DCNNs can be used. Typically, DCNNs gradually consolidate local characteristics of input signals by repeating convolution layers and pooling layers. DCNNs are NNs that, by thus obtaining information that is robust against deformation and positional deviation, perform tasks. For example, those described in the following Document A and the like are available.

Document A: A. Krizhevsky et al., "ImageNet Classification with Deep Convolutional Neural Networks", Proc. Advances in Neural Information Processing Systems 25 (NIPS, 2012)

In the initial state illustrated in FIG. 3A, the tasks are assigned to the subsequent stage shared layer networks in an approximately even manner. Here, there are nine tasks, Task A to Task I, and three subsequent stage shared layer networks 410, 420, and 430, and three tasks are assigned to each of the subsequent stage shared layer networks. Specifically, Task A, Task B, and Task C are assigned to the subsequent stage shared layer network 410; Task D, Task E, and Task F are assigned to the subsequent stage shared layer network 420; and Task G, Task H, and Task I are assigned to the subsequent stage shared layer network 430. The final layers of the shared layer networks hold different weight coefficients for each task, and only the final layers are non-shared layers. In FIG. 3A, the non-shared layer portions are represented in a simplified manner.

Nine types of object detection tasks can be set for the nine tasks. Examples include face, pupil, head, people, animal, insect, vehicle, building, road, and the like. The tasks are not limited to object detection tasks, and object detection tasks and region detection tasks may be combined. For example, there may be six types of object detection tasks (for example, face, pupil, head, animal, and insect) and three types of region detection tasks (for example, person region, plant region, and sky region). Of course, object category recognition tasks, tracking tasks, scene type recognition tasks, and the like may be set.

In step S302, the learning unit 202 performs multitask learning processing. Since a known method can be applied for the multitask learning processing, detailed descriptions will be omitted, but for example, the method described in Non-Patent Document 1 can be applied. Here, learning is performed with a single learning parameter. The learning parameter here is known as a so-called hyperparameter, which may be, for example, a learning rate, a type of optimizer, a rate of learning data, the type of augmentation of learning data, and the like.

In step S303, the learning unit 202 determines the number of times of learning. In the learning processing, learning of weight coefficients progresses by executing learning a predetermined number of times. T is an interval at which the determination is performed, and a numerical value defining a predetermined number of times, such as 10000 or 50000 times is set. n is a natural number. When the number of times of learning is an integer multiple of the cycle T according to the determination of step S303, the processing proceeds to step S304. Otherwise, the processing returns to step S302, and the learning processing by the learning unit 202 is performed. In the present embodiment, an example in which evaluation is performed based on the number of times of learning has been described; however, the timing at which to perform evaluation may be determined based on learning time, a degree of loss reduction to be described below, and the like.

In step S304, the evaluation unit 204 evaluates the performance of respective tasks using the weight coefficients of NNs learned by the learning unit 202 and the evaluation data stored in the evaluation data storage unit 205. As described above, the evaluation data is configured by evaluation images and ground truth information. In the evaluation, the weight coefficients of NNs learned so far are used for inferring the evaluation images, and the inferred results are compared with the ground truth information of the respective evaluation images. If the inferred result coincides with the ground truth information, that image will be correct, and if not, that image will be incorrect.

As the performance value, an image correct answer rate (=number of correct images/total number of images×100), an image incorrect answer rate (=number of incorrect images/total number of images×100), or the like can be used. When a plurality of detection targets are included in the image, evaluation may be performed for each detection target, and in that case, a detection target correct answer rate (=number of correct targets/total number of targets×100) can be used. In the present embodiment, the image correct answer rate is used as the performance value. The correct answer rate is an index for which the greater the numerical value, the higher the performance.

In step S305, the evaluation unit 204 determines whether the calculated performance values of respective tasks exceed a target value of respective tasks and counts the number of tasks for which the performance value is greater than or equal to the target value and the number of tasks for which the performance value is less than the target value. If the number of tasks for which the performance value is less than the target value is greater than 0, the processing proceeds to step S306. If tasks for which the performance value is less than the target value is 0, the learning processing ends. When the image correct answer rate is used as the performance value, a value such as 70% or 80% is set as the target value. The target value may be different for each task.

In step S306, the network assignment unit 203 references history information is stored in the history management unit 206.

FIGS. 4A and 4B are diagrams illustrating examples of the history information. Here, regarding the history information, two pieces of information, such as those illustrated in FIGS. 4A and 4B, are stored. FIG. 4A illustrates information indicating task assignment for each subsequent stage shared layer network. In particular, it illustrates information related to task assignment at the initial state and after update at each subsequent rounds. Regarding FIG. 4B, the learning results of each task for when a plurality of tasks are combined are stored.

For example, suppose that three tasks, Task A, Task B, and Task C, are assigned to the subsequent stage shared layer network 410. At this time, it is assumed that the performance values are greater than or equal to the target value for Task A and Task B and are less than the target value for Task C according to learning. In that case, "○", which means good, is stored in row "Task A" and column "Task B" in FIG. 4B, and "x", which means bad, is stored in row "task A" and column "task C". Similarly, "○" is stored in row "Task B" and column "Task A", "x" is stored in row "Task B" and column "Task C", "x" is stored in row "Task C" and column "Task A", and "x" is stored in row "Task C" and column "Task B". As the history information, the number of times of learning and information of the ID of the subsequent stage shared layer network may be stored. For example, "1" of "1-410" described in row "Task A" and column "Task B" in FIG. 4B represents the number of times of learning, and "410" represents the ID of the subsequent stage shared layer network.

In step S307, the network assignment unit 203 changes the assignment of networks based on the results of learning by the learning unit 202 and the history information obtained from the history management unit 206. In the present embodiment, the result of performance evaluation of step S304 is used as the result of learning by the learning unit 202. Specifically, the evaluation result of the performance of each task is compared with the target value for the performance of each task.

When the performance values are greater than or equal to the target value in a plurality of tasks assigned to one network, it is determined that the learning results are "good". If the performance values are not greater than or equal to the target value, it is determined that the learning results are "bad". The assignment of tasks for which it has been determined that the learning result is "good" are maintained as is in subsequent learning processing. Meanwhile, tasks for which it has been determined that the learning result is "bad" are assigned to another subsequent stage shared layer network in subsequent learning processing.

When a task is assigned to another subsequent stage shared layer network, previous historical information is used. Specifically, FIG. 4A is referenced, and the task is preferentially assigned to the subsequent stage shared layer network to which it has not been assigned thus far. In addition, the learning result for when it has been combined with another task stored in FIG. 4B is also referenced, and a subsequent stage shared layer network in which there is a task with which it has not yet been combined is given priority. A subsequent stage shared layer network to which a task for which the combination result is "good" is assigned is also given priority. Meanwhile, a subsequent stage shared layer network to which a task for which the combination result is "bad" is assigned is reduced in priority. Here, cases where previous historical information is used will be described, but previous historical information need not be used.

In step S308, the history management unit 206 updates the history information upon receiving the result of network assignment of the network assignment unit 203. Each time update is performed, a new column is added to the table illustrated in FIG. 4A. Regarding FIG. 4B, if there is a new combination of tasks, information of their cells will be updated.

By repeatedly performing the above steps S302 to S308, the assignment for networks are updated based on the learning results. The process thereof will be described in detail with reference to FIGS. 3A to 5C.

As described above, FIG. 3A illustrates the initial state of task assignment for the networks. FIG. 3B indicates a state in which an update has been performed once, FIG. 3C indicates a state in which an update has been performed twice, and FIG. 3D indicates a state in which an update has been performed three times. As described above, FIG. 4A illustrates the initial state of task assignment for the respective subsequent stage shared layer networks. FIG. 4B is information indicating the learning results between tasks for when they have been assigned to the same network.

FIGS. 5A to 5C are diagrams illustrating changes in performance values with respect to the number of times of learning. FIGS. 5A, 5B, and 5C are each a graph of changes in performance values according to learning of respective tasks that have been assigned to the subsequent stage shared layer networks 410, 420, and 430.

As illustrated in FIG. 5A, Task A and Task B, which have been assigned to the subsequent stage shared layer network 410, exceeds the target value by learning of an interval of the number of times of learning 0 to T, but Task C has not reached the target value. Task A and Task B are determined to be good, and Task C is determined to be bad. Similarly, as illustrated in FIG. 5B, in the subsequent stage shared layer network 420, Task D and Task E are determined to be good, and Task F is determined to be bad. Similarly, as illustrated in FIG. 5C, in the subsequent stage shared layer network 430, Task I and Task G are determined to be good, and Task H is determined to be bad.

As a result, the network assignment unit 203 changes the subsequent stage shared layer networks to which Task C, Task F, and Task H, which have been determined to be bad, are assigned. Specifically, as illustrated in FIG. 3B, Task C is assigned to the subsequent stage shared layer network 430, Task F is assigned to the subsequent stage shared layer network 410, and Task H is assigned to the subsequent stage shared layer network 420, and re-learning is performed. At that time, the history information illustrated in FIGS. 4A and 4B is appropriately updated.

Subsequently, Task A, Task B, and Task F, which have been assigned to the subsequent stage shared layer network 410, all exceed the target value by learning of an interval of the number of times of learning T to 2T of FIG. 5A. Therefore, Task A, Task B, and Task F are determined to be good. As illustrated in FIG. 5B, in the subsequent stage shared layer network 420, Task E and Task H are determined to be good, and Task D is determined to be bad. As illustrated in FIG. 5C, in the subsequent stage shared layer network 430, Task I and Task G are determined to be good, and Task C is determined to be bad.

As a result, the network assignment unit 203 changes the subsequent stage shared layer networks to which Task C and Task D, which have been determined to be bad, are assigned. Specifically, as illustrated in FIG. 3C, Task C is assigned to the subsequent stage shared layer network 420, and Task D is assigned to the subsequent stage shared layer network 430, and re-learning is performed. At this time, the history information is referenced, and since the learning result of Task D is bad when combined with Task F and Task H, Task D is assigned to the subsequent stage shared layer network 430. The history information illustrated in FIGS. 4A and 4B is appropriately updated.

Subsequently, learning of an interval of the number of times of learning 2T to 3T is performed. As illustrated in FIG. 5A, the target value has been achieved for all the tasks assigned to the subsequent stage shared layer network 410 at this point. In such a case, a configuration may be taken so as to not to perform learning of the preceding stage shared layer network 400 and the subsequent stage shared layer network 410 and only perform learning of the subsequent stage shared layer networks 420 and 430. In the case where only the subsequent stage shared layer networks 420 and 430 are learned, the learning of weight coefficients of the subsequent stage shared layer network 410 does not progress, and so, the performance values of the tasks also do not change. Therefore, the performance values of respective tasks in the interval of 2T to 3T in FIG. 5A is indicated as straight lines parallel to the horizontal axis.

In the subsequent stage shared layer network 420 and 430 illustrated in FIGS. 5B and 5C, only learning of the subsequent stage shared layer networks is performed. As a result, all three tasks, Task E, Task H, and Task C, which are assigned to the subsequent stage shared layer network 420, exceed the target value and are determined to be good. Task D and Task G, which are assigned to the subsequent stage shared layer network 430, exceed the target value and are determined to be good. Since Task I is below the target value, it is determined to be bad. As a result, the network assignment unit 203 assigns Task I, which has been determined to be bad, to the subsequent stage shared layer network 410 as illustrated in FIG. 3D. The history information illustrated in FIGS. 4A and 4B is appropriately updated.

Subsequently, learning of an interval of the number of times of learning 3T to 4T is performed, and four tasks, which are Task A, Task B, Task C, and Task I, all reach the target value, as illustrated in of FIG. 5A. In the learning of this interval, since only the subsequent stage shared layer network 410 is a learning target, the weight coefficients and the performance values of the subsequent stage shared layer networks 420 and 430 do not change as illustrated in FIGS. 5B and 5C.

In the end, in step S305, the number of tasks whose performance value is less than the target value becomes 0 and the learning processing is terminated. As described above, by repeatedly executing steps S302 to S308, the combination of tasks with which the target value can be reached for all tasks can be found efficiently.

As described above, according to the first embodiment, the combination of tasks for when a plurality of tasks are learned in parallel (multitask learning) is sequentially updated based on the learning results. This makes it possible to determine appropriate task assignment for when performing multitask learning.

First Variation

In a first variation, another form of NNs in which the above method functions effectively will be described. Specifically, a network in which the preceding stage shared layer network 400 of the first embodiment (FIG. 3A) is not included can be given as an example. Since the functional configuration and the learning processing of the information processing apparatus are similar to those of the first embodiment (FIGS. 1 and 2), detailed descriptions will be omitted.

Figure 6:
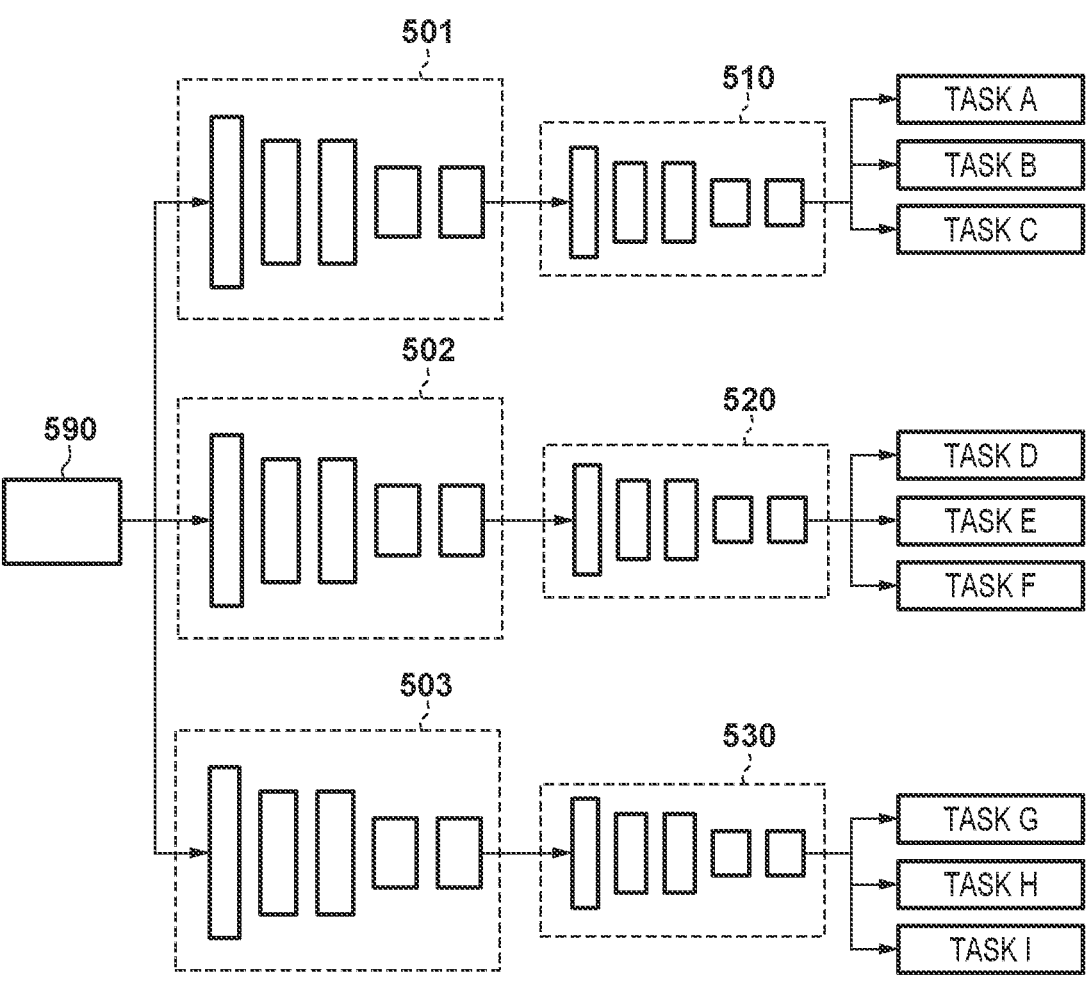
FIG. 6 is a diagram illustrating configurations of NNs (first variation).

FIG. 6 is a diagram illustrating configurations of NNs according to the first variation. As described above, there is no preceding stage shared layer network that is shared by all tasks. Preceding stage shared layer networks 501, 502, and 503 are shared by a plurality of tasks that are assigned to subsequent stage shared layer networks 510, 520, and 530 but are not shared by all tasks.

The network size can be reduced by using a preceding stage shared layer network that is shared by all tasks and has been described in the first embodiment. Meanwhile, inter-task dependency increases beyond the subsequent stage shared layer networks, and so, difficulty of learning increases.

In the NNs of the first variation, the network size increases in comparison to the first embodiment (FIG. 3A);

however, there is no inter-task dependency beyond the subsequent stage shared layer networks, and so, difficulty of learning itself decreases. Therefore, it is better to select an appropriate network configuration according to network size limitations at the application destination.

Second Variation

In a second modification, a form in which learning is performed using a plurality of learning parameters and task assignment is performed based on an integrated learning result for which results of the learning has been integrated will be described. Since the functional configuration of the information processing apparatus is similar to those of the first embodiment (FIG. 1), detailed descriptions will be omitted. In addition, regarding the learning processing, only steps S302, S304, and S307 are different from those of the first embodiment (FIG. 2). Therefore, these points of difference will be described below.

In step S302, the learning unit 202 performs multitask learning processing using a plurality of learning parameters. In the above-described first embodiment, learning is performed with a single learning parameter in step S302, and so, there are cases where the cause of poor learning in the learning of step S302 may be unknown. Specifically, it is usually not easy to separate whether the learning did not go well due to the set learning parameter or the combination of tasks. Therefore, in the second variation, learning is performed using a plurality of learning parameters, and learning quality determination is performed based on an integrated learning result for which the learning results have been integrated.

In step S302 of the second modification, a case where a plurality of learning rates are used as a plurality of learning parameters will be described. Specifically, it is assumed that learning is performed using three types of parameters, which are the learning rates, "0.5", "1.0", and "2.0". However, there are various learning parameters as described above, and the learning parameters are not limited to the learning rates.

In step S304, the evaluation unit 204 evaluates the performance values of results for which learning has been performed using a plurality of learning parameters. In step S307, the network assignment unit 203 performs integrated determination-based quality determination based on the performance values of the three tasks.

Figures 7, 8:
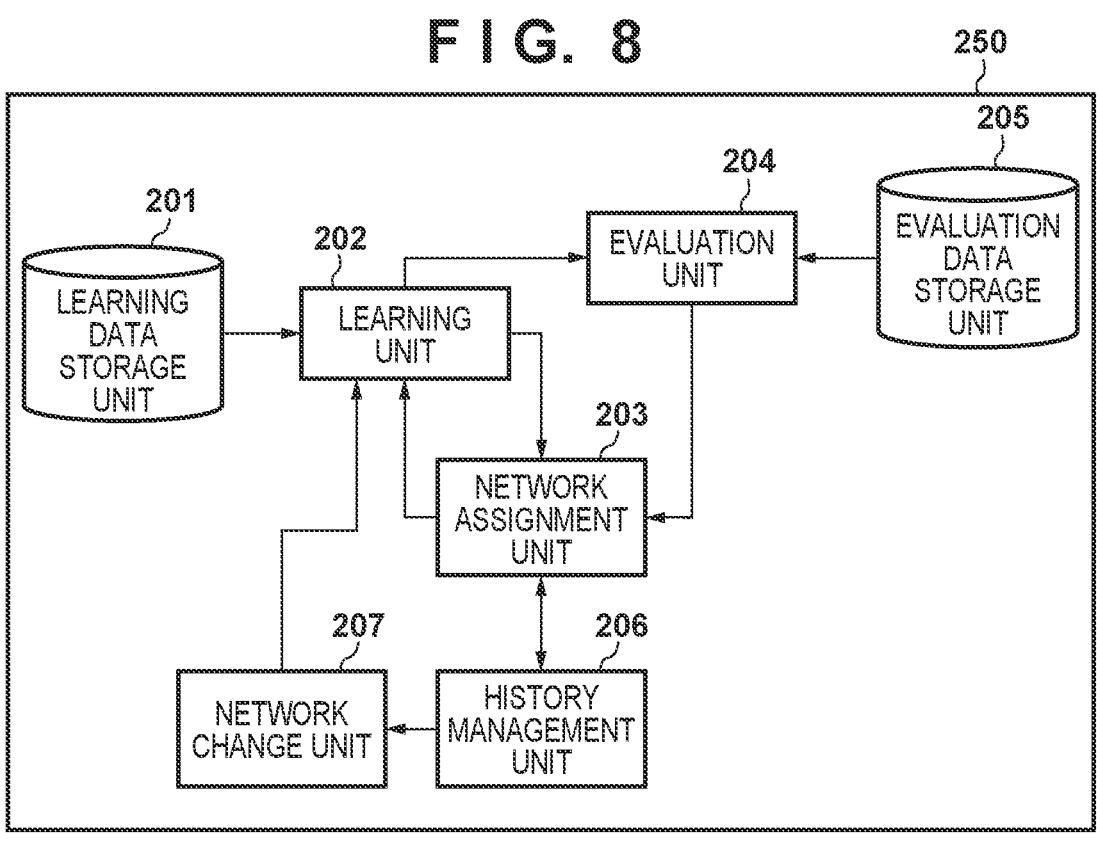
FIG. 7 is a diagram illustrating an example of integrated determination results (second variation).
FIG. 8 is a block diagram illustrating a functional configuration of the information processing apparatus (second embodiment).

FIG. 7 is a diagram illustrating an example of integrated determination results according to the second modification. Specifically, FIG. 7 illustrates quality determination results for each of Task A, Task B, Task C, which are assigned to the subsequent stage shared layer network 410, and integrated determination results, which can be obtained by integrating those results.

Specifically, regarding Task A, results, which are good at the learning rate "0.5", bad at the learning rate "1.0", and good at the learning rate "2.0", have been obtained. Regarding Task B, results, which are good at the learning rate "0.5", good at the learning rate "1.0", and good at the learning rate "2.0", have been obtained. Regarding Task C, results, which are bad at the learning rate "0.5", bad at the learning rate "1.0", and good at the learning rate "2.0", have been obtained.

Here, the integrated determination results are determined by, for example, majority rule. That is, Task A has two goods and one bad and thus is determined to be good. Task B has three goods and no bads and thus is determined to be good. Task C has one good and two bads and thus is determined to be bad. In step S307, tasks and network assignment are changed based on these integrated determination results. However, instead of determination by majority rule, the learning result of the parameter that is thought to be the most reliable among the three parameters may be adopted.

By performing evaluation based on the results of learning for which a plurality of learning parameters have been used as in the second variation improves the accuracy of determining the appropriateness of results of learning according to the combination of tasks.

Second Embodiment

In a second embodiment, unlike the first embodiment, in which tasks are assigned to a plurality of networks in the initial state, an embodiment that starts learning in a state in which all tasks have been assigned to one network as the initial state will be described. Specifically, the network configuration is changed when the learning difficulty is high and it is difficult to reach the performance target value with the network configuration that was first set, and then learning is performed.

<Apparatus Configuration>

FIG. 8 is a block diagram illustrating a functional configuration of an information processing apparatus 250 according to the second embodiment. The configuration is such that a network change unit 207 has been added to the information processing apparatus 200 of the first embodiment (FIG. 1). Since the rest of the configuration is the same as that of the information processing apparatus 200, descriptions will be omitted.

The network change unit 207 changes the network configuration based on the learning results of learning by the learning unit and the history information stored in the history management unit.

<Apparatus Operation>

FIG. 9 is a flowchart of learning processing to be performed the information processing apparatus 250 according to the second embodiment. Here, M types of tasks are performed using N NNs.

In step S701, the network assignment unit 203 sets an initial state of networks and tasks. In the second embodiment, the number of NNs N=3 and the number of tasks M=9, similarly to the first embodiment. However, as described above, a state in which all tasks are assigned to one NN is assumed as the initial state.

Figure 10A:
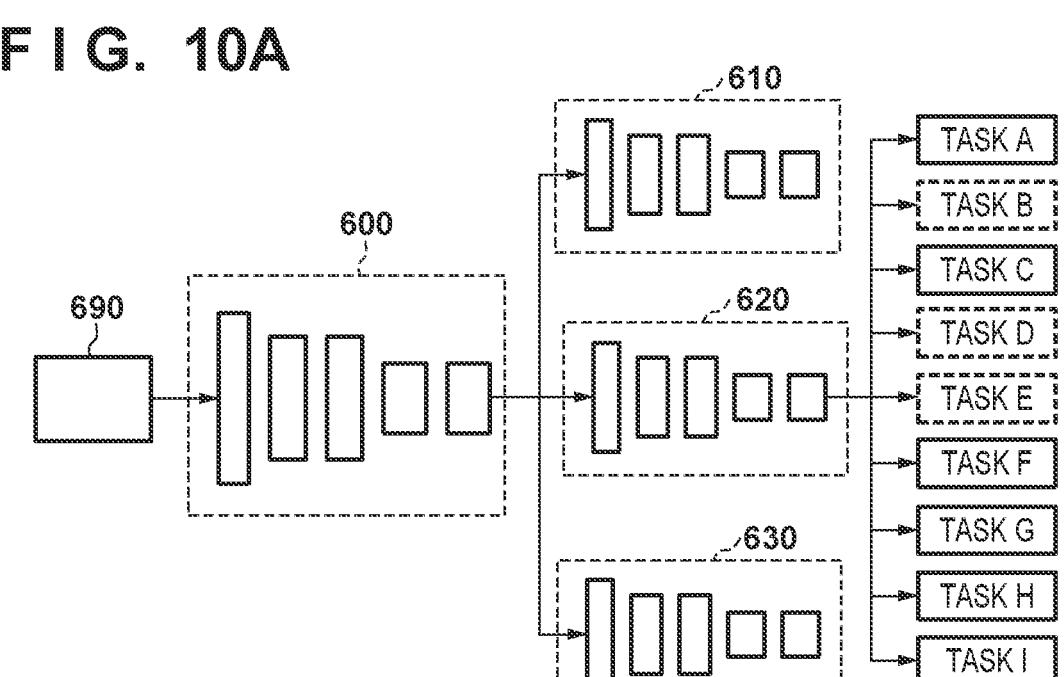
FIGS. 10A to 10D are diagrams illustrating configurations of NNs and task assignment (second embodiment).

FIGS. 10A to 10D are diagrams illustrating configurations of NNs and task assignment according to the second embodiment. FIG. 10A is a diagram illustrating the configurations of NNs and the initial state of task assignment. An image 690 is an input for the NNs.

The NNs are configured by a preceding stage shared layer network 600 and subsequent stage shared layer networks 610, 620, and 630. The preceding stage shared layer network 600 is an NN to be a shared layer for all tasks. In addition, the subsequent stage shared layer networks 610, 620, and 630 are NNs to be shared layers only for the tasks assigned to the respective networks. In the initial state, all tasks are assigned to the subsequent stage shared layer network 620. Similarly to the first embodiment, DCNNs can be used as NNs.

In step S702, the learning unit 202 performs multitask learning processing. At that time, the value of loss at the time of learning is calculated. Loss is an objective function that serves as an index for bringing the weight coefficients of an NN close to optimum parameters and represents an error between the target value and the value at the time of inference. A sum of squared errors, a cross-entropy error, or the like can be used as a loss function, which is an objective function. A different loss function may be used for each type of task. The smaller the value of loss, the better the learning result.

In step S703, the learning unit 202 counts the number of tasks for which the value of loss is less than or equal to the target value and determines whether the number is greater than or equal to m. If the determination result is NO, the processing proceeds to step S704. If the determination result is YES, the processing proceeds to step S705. In the second embodiment, m=3. That is, learning of nine tasks is started, and the learning is continued until the loss value is below the target value in three tasks. The target value for loss may be set to a different value for each task. Different values may be set depending on the type of loss function.

In step S704, the learning unit 202 determines whether the number of times of learning is an integer multiple of Tmax. If the number of times of learning is not an integer multiple of Tmax, the processing returns to step S702 and the learning processing is repeated. If the number of times of learning is an integer multiple of Tmax, the processing proceeds to step S710.

In step S705, the network assignment unit 203 references history information stored in the history management unit 206.

FIGS. 11A and 11B are diagrams illustrating an example of history information according to the second embodiment. Here, regarding the history information, two pieces of information, such as those illustrated in FIGS. 11A and 11B, are stored. FIG. 11A illustrates information indicating task assignment for each subsequent stage shared layer network. In particular, it illustrates information related to task assignment at the initial state and after update at each subsequent rounds. Regarding FIG. 11B, the learning results of each task for when a plurality of tasks are combined are stored.

In step S706, the network assignment unit 203 assigns m tasks for which the value of loss is less than or equal to the target value according to the determination of step S703 to another subsequent stage shared layer network. In step S707, the network assignment unit 203 copies the weight coefficients of the subsequent stage shared layer network 620 of that point in time to that other subsequent stage shared layer network. In step S708, the network assignment unit 203 updates the history information, which is managed by the history management unit 206, based on the result of network assignment.

In step S709, if the number of tasks for which the value of loss is greater than the target value is greater than 0, the learning unit 202 returns to step S702 and continues learning. If the number of tasks for which the value of loss is greater than the target value becomes 0, the processing ends.

Incidentally, in the aforementioned determination of step S704, it has been mentioned that the processing proceeds to step S710 when a condition that the number of times of learning is an integral multiple of Tmax is satisfied. This corresponds to the case where, even if the learning processing is performed a predetermined maximum number of times, the number of tasks for which the value of loss is less than or equal to the target value is a predetermined number or more (m or more) (i.e., there are m or more tasks for which the performance value does not improve beyond the target value). This means that in such a case it is determined that there is a limit to improvement in performance by the combination of tasks being changed and an attempt will be made to improve performance by changing the network configuration.

The network configuration is changed as a solution in particular for cases where performance does not improve even after having tried various combinations based on the history information. For example, Tmax is set to 100,000 times. If the performance does not improve even after performing learning for 100,000 times, the network configuration is changed. Changing the network configuration includes increasing the number of layers of the network and increasing the number of channels of each layer, for example.

By repeatedly performing steps S702 to S709, network assignment is updated based on the learning results. The network configuration is changed by applying step S710. The process thereof will be described in detail with reference to FIGS. 10A to 12C.

Figures 10B, 10C, 10D:
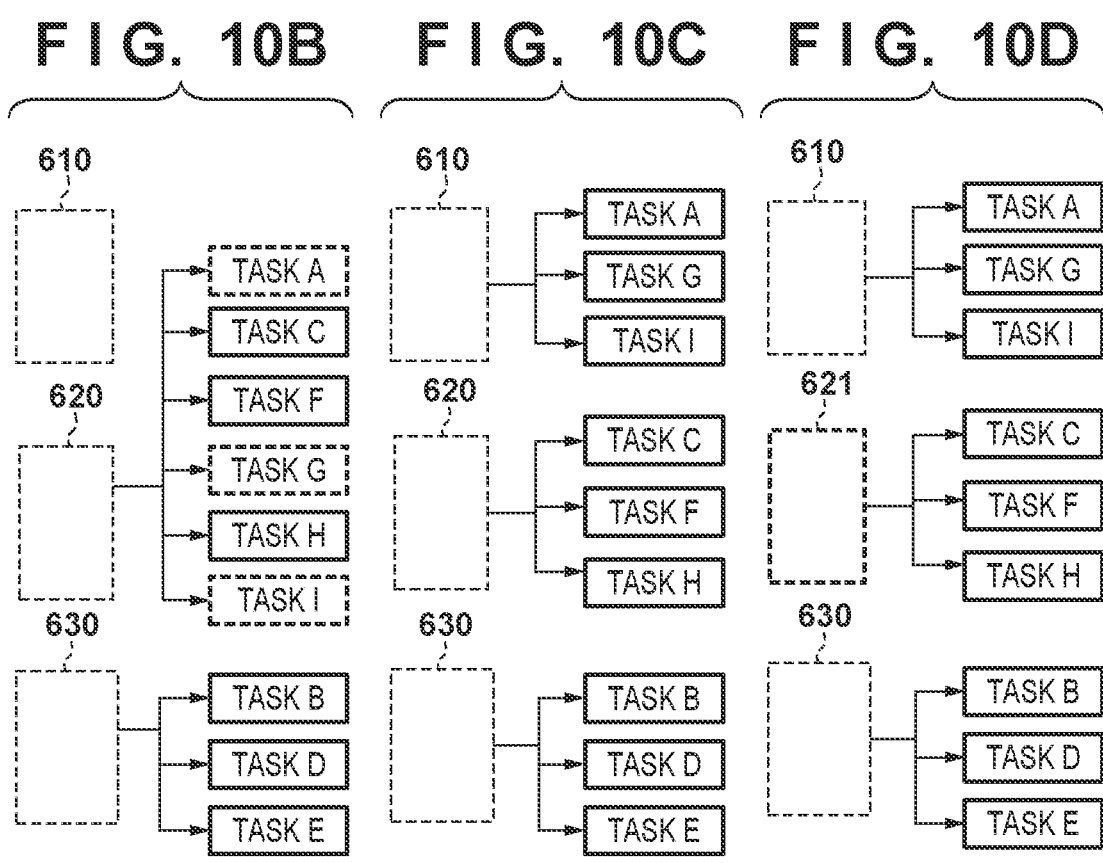

As described above, FIG. 10A illustrates the initial state of task assignment for the networks. FIG. 10B indicates a state in which an update has been performed once, FIG. 10C indicates a state in which an update has been performed twice, and FIG. 10D indicates a state in which an update has been performed three times. As described above, FIG. 11A illustrates the initial state of task assignment for the respective subsequent stage shared layer networks. FIG. 11B is information indicating the learning results between tasks for when they have been assigned to the same network.

FIGS. 12A to 12C are diagrams illustrating changes in loss with respect to the number of times of learning. FIGS. 12A, 12B, and 12C are each a graph of changes in loss according to learning of nine tasks that have been assigned to the subsequent stage shared layer network 620. FIG. 12A is a graph of loss for three tasks with the fastest progress in learning, FIG. 12B is a graph of loss for three tasks with the next fastest progress in learning, and FIG. 12C is a graph of loss for three tasks with the slowest progress in learning.

In an interval of the number of times of learning 0 to T1 of FIGS. 12A to 12C, the processing of steps S702 to S704 is repeated. Since m=3, the condition of step S703 becomes satisfied ("YES") when the losses of three tasks, which are Task D, Task E, and Task B, become less than or equal to the target value, and the process proceeds to step S705.

In step S705, the history information stored in the history management unit is referenced. Here, it can be confirmed that there is no task assigned to the subsequent stage shared layer network 610 and 630. In step S706, the learning results of three tasks, which are Task D, Task E, and Task B, are good, and so, those three tasks are assigned to the subsequent stage shared layer network 630 as illustrated in FIG. 10B.

In step S706, the weight coefficients of the subsequent stage shared layer network 620 are copied to the subsequent stage shared layer network 630. In step S708, the history is updated. Specifically, the history is updated as illustrated in the first update of FIG. 11A. In addition, the status "good" is written in the cells of Task B, Task D, and Task E in FIG. 11B. In step S709, tasks for which the value of loss is greater than the target value remain, and so, the processing returns to step S702.

Next, in an interval of the number of times of learning T1 to T2 of FIGS. 12B and 12C, the processing of steps S702 to S704 is repeated. The condition of step S703 becomes satisfied ("YES") when the losses of three tasks, which are Task I, Task G, and Task A, become less than or equal to the target value, and the processing proceeds to step S705. In step S705, the history is referenced, and in step S706, three tasks, which are Task I, Task G, and Task A, are assigned to the subsequent stage shared layer network 610 as illustrated in FIG. 10C. In step S707, the weight coefficients of the subsequent stage shared layer network 620 of that point in time is copied to the subsequent stage shared layer network 610, and in step S708, the history is updated. In step S709, tasks for which the value of loss is greater than the target value remain, and so, the processing returns to step S702.

Next, in an interval of the number of times of learning T2 to T3 of FIG. 12C, the processing of steps S702 to S704 is repeated. However, in this interval, even if the preset value of the number of times of learning Tmax is reached in step S704, the only task for which the loss becomes smaller than the target value is Task F, and so, the processing proceeds to step S710, and the network configuration is changed. As illustrated in FIG. 10D, the subsequent stage shared layer network 620 is replaced with a subsequent stage shared layer network 621 whose network configuration has been changed. To change the network configuration, the number of channels of each layer of the network or the number of layers of the network may be increased. As illustrated in FIG. 12C, the losses of remaining tasks, Task C and Task H, become smaller than the target value due to learning of the number of times of learning Tmax to T3, and the learning ends.

As described above, according to the second embodiment, the network configuration is changed upon having explored task combinations that are appropriate for learning. Therefore, it is possible to keep an increase in network size to a minimum while improving performance values.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-001912, filed Jan. 10, 2023 which is hereby incorporated by reference herein in its entirety.

What is claimed is:

1. A learning apparatus comprising one or more memories storing instructions and one or more processors that execute the instructions to:

perform a first assignment in which M tasks that are different from each other are assigned to N neural networks (where N<M) and perform learning processing that is related to the M tasks in parallel; and determine, based on learning results of the respective M tasks, whether to assign, in subsequent learning processing, the respective M tasks to the same neural networks as in the first assignment or to neural networks different from those of the first assignment.

2. The learning apparatus according to claim 1, wherein the one or more processors execute the instructions to:

perform a predetermined number of times of learning processing for the first assignment in which the M tasks are assigned to the N neural networks; and determine, by comparing results of learning in the first assignment, whether to assign, in a second assignment in which the M tasks are assigned to the N neural networks in subsequent learning processing, a first task and a second task, which have been assigned to the same neural network in the first assignment, to the same neural network or to different neural networks.

3. The learning apparatus according to claim 1, wherein the one or more processors execute the instructions to:

assign, in an initial state in which the learning processing is started, the M tasks to the N networks in an approximately even manner.

4. The learning apparatus according to claim 1, wherein the one or more processors execute the instructions to:

assign, in an initial state in which the learning processing is started, the M tasks to one network.

5. The learning apparatus according to claim 1, wherein the one or more processors execute the instructions to:

determine an assignment of the M tasks to the N neural networks in subsequent learning processing, using information that is related to losses at the time of learning, the losses being calculated as the learning results.

6. The learning apparatus according to claim 1, wherein the one or more processors execute the instructions to:

calculate performance values of weight coefficients of learned neural networks, using the weight coefficients and evaluation data that includes evaluation images and ground truth information; and determine an assignment of the M tasks to the N neural networks in subsequent learning processing, using the performance values that have been calculated as learning results.

7. The learning apparatus according to claim 1, wherein the one or more processors execute the instructions to:

manage history of assignment that has been determined and in which the M tasks are assigned to the N neural networks; and determine, based on the learning results and the managed history of assignment, an assignment of the M tasks to the N neural networks in subsequent learning processing.

8. The learning apparatus according to claim 1, wherein the one or more processors execute the instructions to:

manage the history of assignment and a learning result of each task for when a plurality of tasks are combined.

9. The learning apparatus according to claim 1, wherein the one or more processors execute the instructions to:

change a configuration of at least one neural network when a predetermined condition is satisfied, wherein the predetermined condition is that learning processing is performed a predetermined maximum number of times and that the number of tasks for which a value of calculated loss at the time of learning is less than or equal to a target value is greater than or equal to a predetermined number.

10. The learning apparatus according to claim 1, wherein the one or more processors execute the instructions to:

perform learning processing using a plurality of learning parameters; and determine, based on an integrated learning result for which a plurality of learning results according to the plurality of learning parameters have been integrated, an assignment of the M tasks to the N neural network in subsequent learning processing.

11. The learning apparatus according to claim 1, wherein the N neural networks include a shared layer that is shared by the M tasks.

12. A learning method comprising:

performing a first assignment in which M tasks that are different from each other are assigned to N neural networks (where N<M) and perform learning processing that is related to the M tasks in parallel; and determining, based on learning results of the respective M tasks, whether to assign, in subsequent learning processing, the respective M tasks to the same neural networks as in the first assignment or to neural networks different from those of the first assignment.

13. A non-transitory computer-readable recording medium storing a program that, when executed by a computer, causes the computer to perform a learning method comprising:

performing a first assignment in which M tasks that are different from each other are assigned to N neural networks (where N<M) and perform learning processing that is related to the M tasks in parallel; and determining, based on learning results of the respective M tasks, whether to assign, in subsequent learning processing, the respective M tasks to the same neural networks as in the first assignment or to neural networks different from those of the first assignment.

* * * * *